Jan. 21, 1964  C. B. MARSHALL  3,119,042
APPARATUS AND METHOD FOR FEEDING FABRICATED WELDING WIRE
Filed March 14, 1961  3 Sheets-Sheet 1

INVENTOR
CLAIRE BOND MARSHALL

Charles W. Hull
ATTORNEY

Jan. 21, 1964  C. B. MARSHALL  3,119,042
APPARATUS AND METHOD FOR FEEDING FABRICATED WELDING WIRE
Filed March 14, 1961  3 Sheets-Sheet 2
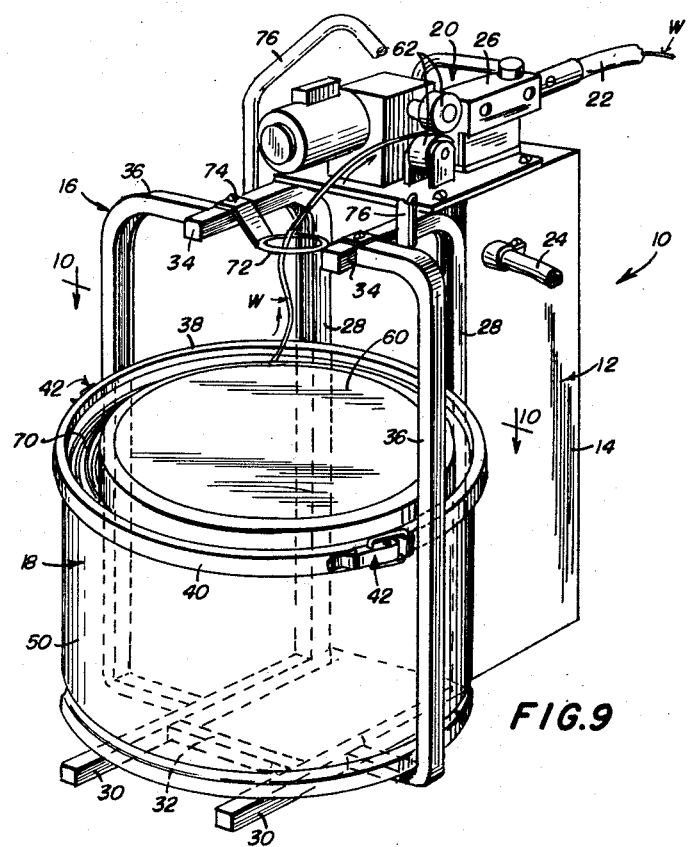
FIG. 9
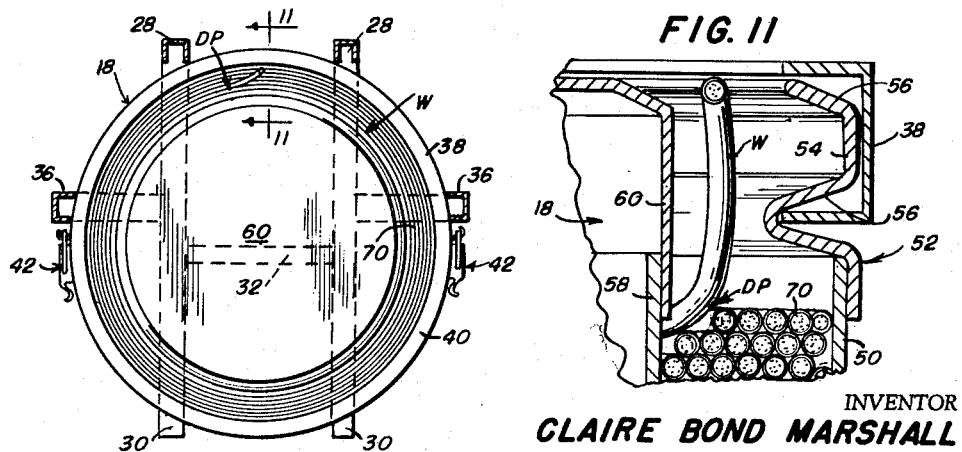
FIG. 11
FIG. 10
INVENTOR
CLAIRE BOND MARSHALL
ATTORNEY Jan. 21, 1964 C. B. MARSHALL 3,119,042
APPARATUS AND METHOD FOR FEEDING FABRICATED WELDING WIRE
Filed March 14, 1961 3 Sheets-Sheet 3
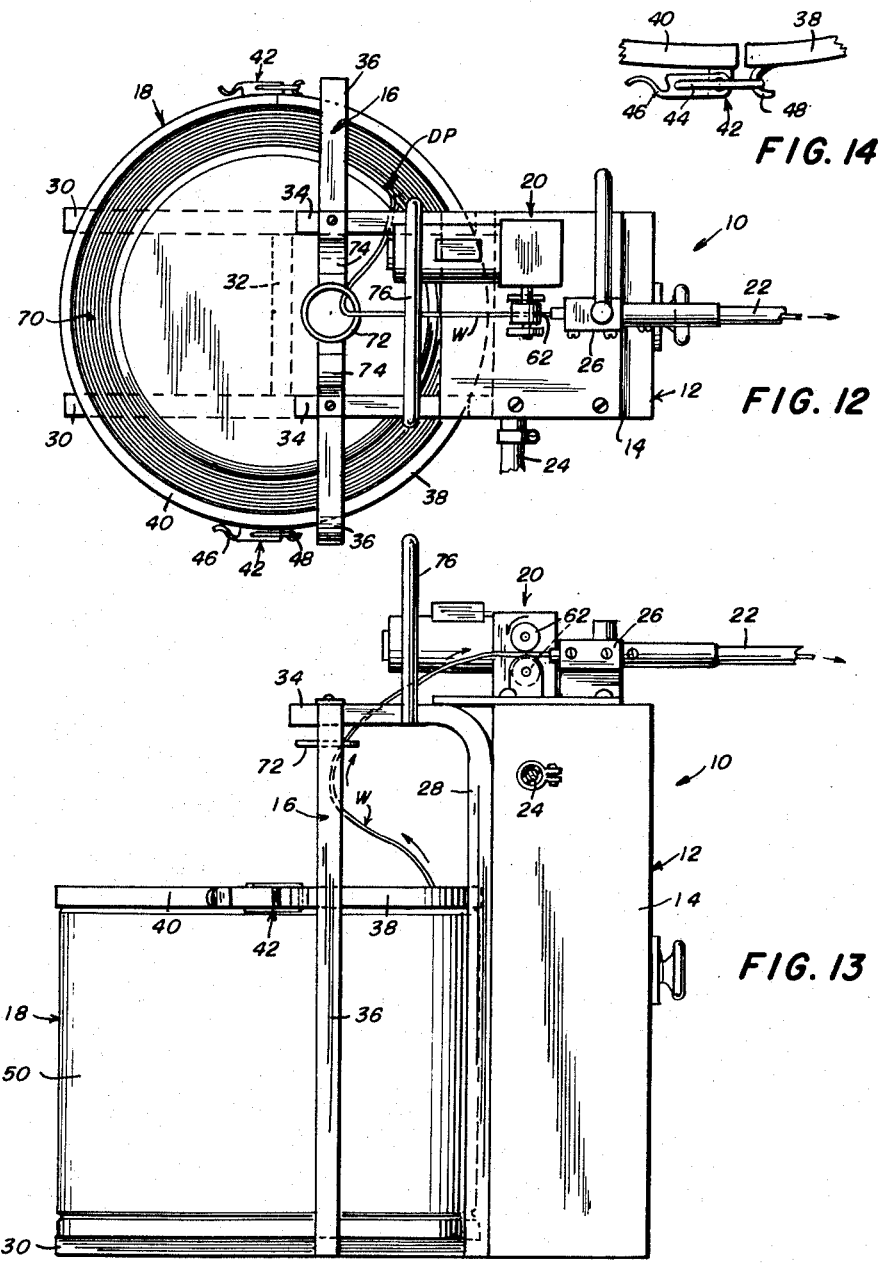
INVENTOR
CLAIRE BOND MARSHALL
ATTORNEY United States Patent Office 3,119,042
Patented Jan. 21, 1964

3,119,042
APPARATUS AND METHOD FOR FEEDING
FABRICATED WELDING WIRE
Claire Bond Marshall, York, Pa., assignor, by mesne assignments, to Chemetron Corporation, Chicago, Ill., a corporation of Delaware
Filed Mar. 14, 1961, Ser. No. 95,624
11 Claims. (Cl. 314—68)

This invention relates to an apparatus and method for feeding fabricated welding wire. More specifically, this invention relates to an apparatus and method for feeding longitudinally lap-seamed welding wire from a horizontally disposed stationary coil through the conventional welding hose to a welding nozzle.

Still more specifically, this invention relates to an apparatus and method for feeding fabricated welding wire of the type disclosed in the U.S. Patent No. 2,912,612, issued November 10, 1959, of which I am co-inventor. Such fabricated wire is in fact a continuous electrode W comprising a metallic tube T (FIG. 2) containing a core mixture C of metallic powders and fluxing materials. The powders are in part adapted to evolve protective gases or form protective slags to lessen the damage of atomspheric contamination of the molten weld metal. The tube comprises a strip of mild steel or the like shaped into tubular form. Such a tube, with powder inside, is then compressed through drawing dies to decrease its diameter and sealed with an overlapping longitudinal seam, S.

It has been conventional in the prior welding art, excluding the disclosure of my patent above, to feed a coil of electrode from a reel mounted to rotate about a horizontal axis (FIG. 1), the electrode being engaged by drive rollers and urged into a flexible hose with a welding nozzle at its far end. Apparatus for so feeding electrode has had the disadvantage of disproportionate weight for the amount of electrode stored, for the apparatus has had to include spindles, reel, drag, etc.

My aforementioned patent discloses different apparatus and method for feeding such wire. It has the advantage that for the weight of the feed unit, a large amount of electrode is stored: no spindle mounting, reel, or drag is necessary. As disclosed, the source of wire is a coil disposed stationary in a cylindrical paperboard electrically non-conducting container, resting on the floor. The apparatus comprises a feed unit having the conventional adjacent drive rollers adapted to engage the wire and drive it forward into the hose or conduit toward the welding head or nozzle. Intermediate the coil and drive rollers in any prior device is a suitable guide or eye. Forward of the drive rollers are a plurality of straightening rolls adapted to engage the wire and to work out any "kinks" which might be induced in the wire electrode as it snakes up from its coil in the container.

The feed means of my earlier patent including the stationary supply coil represents a great advance in the art over the rotating reel type electrode feeder which was expensive, was made relatively immobile by its heaviness, was constantly "running out" of electrode on account of its limited capacity, and which required "rereeling" of electrode onto the reel in the feeder from a supply source. However, unless used with careful attention of the operator, my arrangement of the aforementioned patent has been found to have a quite serious drawback. Namely, electrode wire has occasionally split open along the longitudinal seam of the fabricated wire, at the zone of split, there has been a consequent expansion of the cross section of the wire, as diagrammed in FIG. 8. The narrow opening of the welding hose has not permitted passage of this expanded portion and the apparatus has jammed. Such jamming has required stoppage of operation and a partial disassembly of the machine to remove the expanded portion of the fabricated welding wire. A fresh electrode lead was then threaded through the machine.

After much study and careful analysis, I have discovered that the splitting of the longitudinal seam S and consequent expansion of the fabricated welding wire has been caused by the uncontrolled rotation of the fabricated wire of 360° in a length of the wire equal to a circumference of the coil. Such rotation of the wire is, as illustrated in FIGS. 3 through 7, a natural consequence of drawing the wire upwardly out of the coil. It will be noted from FIG. 4 that in a cross section taken through the coil, the seams S of each loop of coil are everywhere in the same radial direction from the center of the cross section of wire. Namely, as shown in FIG. 4, for instance, the seams are all directed upward from the center of the wire. As the lead end of the wire coil is drawn upward (FIG. 3), leaving the coil at a departure point, there is a natural twist imparted to the wire, which is inherent from the very nature of the uncoiling movement. From FIGS. 5, 6 and 7, it can be seen that in the length of one loop or circumference of the coil, the relative position of the seam S with respect to the center of the wire has turned 360°. This amount of rotation in a length of wire equal to one circumference of the coil, plus a tension on the wire, has so concentrated or localized the rotation as to produce a "kink" and has split the longitudinal compressed seam at the "kink," causing the jamming mentioned above. In many instances the metallic powders in the core spill out at the "split."

The "concentrated" or "localized" rotation will be seen (in FIG. 3) in its upward snake movement, to define a circumference with a greatly reduced diameter. This is inherent in the very uncoiling travel and is partly responsible for the "seam-splitting" hazard, unless controlled.

It will be noted that in the prior art as evidenced by my prior patent, the wire-containing carton has been disposed on the floor adjacent the pedestal of the feeding means. Heretofore, there have been no means or attempt to keep the container adjacent the feeding means. Consequently, it has been customary when working at a high altitude, many feet or yards above the floor or ground, for instance, to hoist up the feeding means and weld nozzle to a point adjacent the work, leaving the coil container on the floor. This has left several loops of welding wire suspended between the feeding means and the container. With the 360° turns induced in the suspended wire for each length equal to a circumference of the coil, as described above, and especially with the inevitable "tug" or tension on the wire between the feed means and the departure point in the container on the floor, the 360° twists will be confined to short lengths reduced in diameter and form a series of "kinks." The fabricated wire will at these "kinks" part its seam, expands in area, and jams the feed means. This very separation of the feeding means and container, although inadvertent and necessarily resulting from the very design of the mechanism, produces the fracture or splitting of the fabricated wire. The suspension of all stages of the welding operation is immediate.

An additional hazard, much more serious, in such modus operandi, is that the welding wire exposed between the feed means and the container is electrically "hot" and may cause shock to careless or unfamiliar personnel, or short circuiting.

With the foregoing in mind, it is an object of my invention to provide in a welding apparatus a unitary wire feed structure adapted to avoid the rupture of the seam of fabricated welding wire "peeled off" from a flat stationary coil and to thereby avoid "jamming" of the feed means.

It is a further object of my invention to provide a method and means for drawing fabricated welding wire from a stationary coil to feed means without the need for straightening means for the wire.

It is a further object of my invention to provide unitary apparatus for feeding welding wire which reduces the possibility of electrical damage by a length of bare charged wire exposed between the container and the feed means.

In the apparatus and method embodying my invention, I provide means holding the feed means above and to one side of the stationary coil in such a way that the normal length from the departure point to the feed means as measured along the wire is less than the mean circumference of the coil. Thus, there is no possibility of the wire "kinking" before it reaches the feed means. Parting of the longitudinal seam of the fabricated wire is thus obviated and "jamming" of the apparatus is precluded.

This invention embodies other novel features, details of construction and arrangement of parts which are hereinafter set forth in the specification and claims and illustrated in the accompanying drawings wherein:

FIG. 9 is a perspective view of one form of apparatus embodying the invention;

FIG. 10 is a fragmentary sectional view taken on the line 10—10 of FIG. 9;

FIG. 11 is an enlarged fragmentary sectional view taken on the line 11—11 of FIG. 10;

FIG. 12 is a top plan view of the apparatus embodying the invention;

FIG. 13 is a side elevational view of the apparatus embodying the invention; and FIG. 14 is an enlarged fragmentary top view showing a clasp used with the apparatus of the invention.

Figure 1:
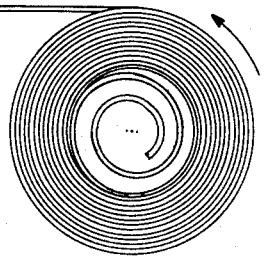
FIG. 1 is a schematic view showing the method of unwinding a welding coil as in the prior art.
Figure 2:
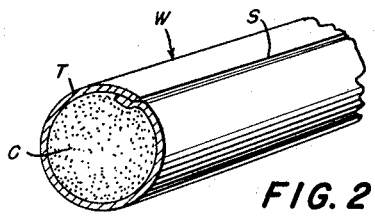
FIG. 2 is a greatly enlarged perspective view of a fragment of a fabricated welding wire with which the present invention is used.
Figure 3:
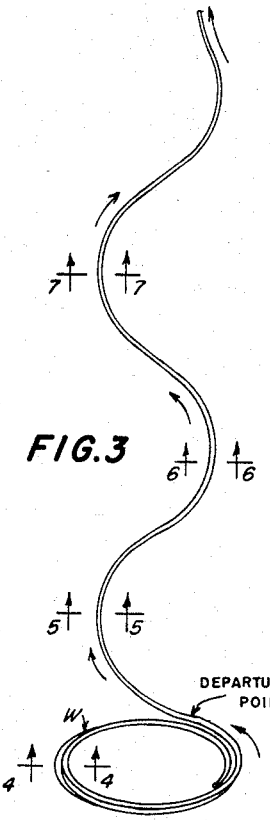
FIG. 3 is a perspective view illustrating the unwinding of wire from a stationary coil as designed and used in the present improvements.
Figure 7:
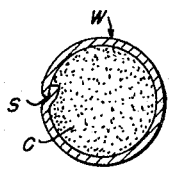
FIG. 7 is an enlarged sectional view taken on the line 7—7 of FIG. 3.
Figure 6:
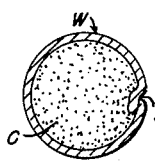
FIG. 6 is an enlarged sectional view taken on the line 6—6 of FIG. 3.
Figure 5:
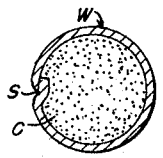
FIG. 5 is an enlarged sectional view taken on the line 5—5 of FIG. 3.
Figure 4:
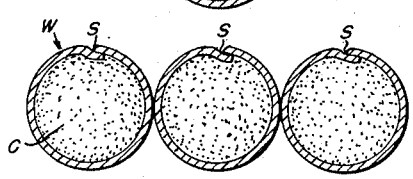
FIG. 4 is an enlarged sectional view taken on the line 4—4 of FIG. 3.
Figure 8:
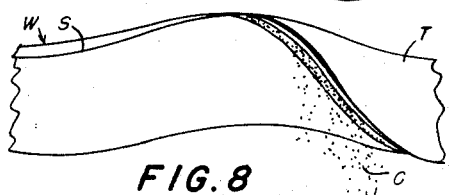
FIG. 8 is an enlarged fragmentary perspective view showing the parting of the seam of a fabricated wire electrode under twist at a "kink"

Referring more specifically to the drawings, an apparatus embodying the invention is illustrated in FIG. 9 and generally designated 10. It comprises support means 12 which may include an upright pedestal 14. To one side of the pedestal 14 is secured a cage 16 also part of the support means and adapted to hold a container 18 of fabricated welding wire W. Onto the upper end of the pedestal 14 is secured the feed means 20 positioned above and to one side of the top of the container 18. From the forward end of the feed means extends a flexible tube 22 to a nozzle (not shown) where the welding is actually accomplished.

Still more specifically, the pedestal 14 comprises a rectangular cabinet housing electrical controls for the welding means. To the controls is connected an electrical supply cable 24 which, through means not part of this invention, engages the fabricated electrode wire W at a terminal block assembly 26.

It will be apparent to those skilled in the art that the entire assembly of the present improvements is suitably insulated in any desired manner for the safety and protection of property and operating personnel.

The cage 16 comprises a pair of parallel spaced upright rear frame members 28 secured to one face of the pedestal 14. The lower end of the frame members extends right-angularly flush with the base of the pedestal and comprise feed 30 adapted to serve as container support means. The feet may be interconnected by a bridge member 32 (FIG. 12). The upper ends of the frame members are similarly bent right angularly outward and comprise arms 34 directed parallel to the feet. Side frame members 36 are of U-shape and oppose each other, their ends being connected respectively to the two feet and to the two arms.

Disposed in a horizontal plane spaced above the feet is an arcuate element comprising a fixed one-half 38 of a clamp. The arcuate element 38 is secured to the side frame members 36 and to the rear frame members by weldments. The arcuate frame member is channel-shaped in cross section (see FIG. 11) and extends through an arc of about 180°. The companion part of the clamp comprises a removable second 180° arc channel-shaped element 40. The two companion clamp pieces are secured together to form a circular clamp (FIG. 10) by a pair of luggage-type clasps 42 (FIG. 14), each comprising a pair of links 44 and 46 pivotally secured together and one link being pivotally secured to the removable clamp element 40. The distal link 44 is adapted to engage a hook 48 on the end of the fixed clamp element.

As disclosed in my prior art patent, the stationary coil of the electrode wire is stacked in a horizontally disposed cylindrical container 18, having a vertical axis. A preferred container is specifically disclosed in the U.S. Patent No. 2,579,974 and includes a fiberboard shell 50 having at its upper end a metallic head or rim element 52 (FIG. 11) of modified channel-shape comprising a peripheral face 54 and inward upper and lower shoulders 56. The container 18 has within the coil a core 58 with a metal cap 60 or "slinger ring" which leaves an annular opening for withdrawal of the wire (FIG. 10) and serves to engage the wire as it is pulled out from its coil and applies a slight frictional drag thereto. While this engagement feature is preferable in the illustrated embodiment, it is not essential to the successful operation of the improvements.

In the installation of the container into the cage 16, the removable clamp element 40 is taken out of the cage, and the electrode container 18 is slipped laterally thereinto. As shown in FIG. 11, the channel-shaped fixed clamp member 38 receives in its opening in firm engagement the rim 52 of the container. By means of this engagement, vertical displacement of the container 18 from the cage 16 is impossible. Subsequently, the removable clamp element 40 is brought into place, its channel-shaped opening similarly engaging the rim 52 of the container. With the two clasps 42 engaged to effect a rigid clamping annulus, displacement of the container 18 in any direction is prevented.

Secured onto the top of the pedestal 12 are the conventional feed driving means 20 similar to that disclosed in my earlier above-mentioned patent. The drive means comprise a pair of cooperating rollers 62, one of which is powered by a small electric motor and the other of which is an idler. The rollers are spring-biased together by means not shown. It may be noted that the electrode engages between these rollers 62 and then is urged into the terminal block assembly 26 and thence into the flexible hose 22 to the welding nozzle (not shown).

The position or location of the feed rollers 62 is critical. They must be positioned such that the length of the electrode W measured between the departure point DP (FIG. 10) from the coil and the feed rollers 62 is less than the mean circumference of the coil 70 in the container 18. As pointed out above, by having this distance less than one circumference, the likelihood of a 360° twist which may form a "kink," parting the seam of the wire, is eliminated.

In a specific example, a coil 70 may have an inside diameter of 13½ inches and an outside diameter of 20 inches. The mean diameter is 16¾ inches and the length of wire stacked or laid along the circumference of this diameter would be 52½ inches. Therefore, the distance between the departure point DP and the rollers 62 as measured along the electrode W must be less than 52½ inches. This specific example, however, is meant as illustration only and not as a lmitation. It is submitted that the diameter of the particular wire being used is a factor in determining this critical distance.

Serving as a guide means for the fabricated electrode to avoid its interfering with the frame members of the cage 16 is a guide eye 72. The eye is disposed in a horizontal plane and mounted by a pair of outwardly and upwardly directed strips 74 having their outer ends secured respectively to the upper surfaces of the arms 34. Reference to FIGS. 12 and 13 indicates that the eye 72 is preferably offset from the vertical centerline of the coil 70 toward the side of the container 18 on which the feed driving means 20 is disposed. By trial and error it has been discovered that this offset should be about one-tenth of the mean diameter of the coil 70. The eye 72 is disposed in a horizontal plane above the container 18 about two-thirds of the distance between the top of the container and a horizontal line extending between rollers 62.

Completing the assembly is a handle member 76 comprising an inverted generally V-shaped element. The lower ends of the element 76 may be and preferably are secured to the arms 34 respectively. In order that the apparatus may be hoisted above the ground by engagement of the center of this handle, the element 76 is disposed approximately over the center of gravity of the unit.

By means of the apparatus and method which I have developed, the possibility of "kinking" of fabricated electrode wire is eliminated. Consequently the parting of the seams of the wire and the consequent jamming of the feed means is eliminated. This apparatus makes the use of fabricated welding wire almost foolproof and the operator no longer has to worry about the electrical hazard of the exposed wire between the coil and the feed means.

Additionally, I have developed a very effective unit wherein the container is securely held against the welding cabinet with no possibility of separation.

A further outstanding advantage of the present improvements resides in the creation of a practical and foolproof welding unit embodying a portable pack of fabricated electrode wire having a minimum weight of 125 pounds, comprising approximately 4,000 feet of wire and about 1,000 circumferential loops. As this wire lays, or is stacked in this container, it is not under tension, but is "in repose" so to speak. It is significant, therefore, that the wire, in coiled form, may be deposited in the cage 16 with suitable uprights to provide a fence, and the container 18 dispensed with. Moreover, any suitable means may be provided to contain the coil. Obviously, however, the container supplies a convenient and easily handled delivery means.

Moreover, the present improvements provide a consolidated welding unit, having at least a capacity of 125 pounds, and in many instances a greater capacity, thereby affording more extended, continuous and uninterrupted welding operations before the necessity of "reloading."

While this invention has been shown in but one form, it will be obvious to those skilled in the art that it is not so limited but is susceptible to various changes and modification without departing from the spirit and scope of the claimed invention.

What I claim as my invention is:

1. A welding apparatus comprising a stationary coil of fabricated welding wire defined by a continuous longitudinally lap-seamed tube compressing a powdered core, said coil being disposed in an open container about a vertical axis; driving means disposed above and just to one side of said coil, an end of said wire leaving the coil at a departure point and leading upward from said coil, and being engaged by said driving means, said driving means driving said wire toward a welding point; unitary support means supporting said coil and said driving means and fixing their spatial relation, the distance measured along the wire from said departure point to said drive means being less than the mean circumference of the coil, and a guide eye secured to said support means and disposed in a horizontal plane two-thirds the distance above said container to said driving means and offset from the axis of said coil in a horizontal direction toward said driving means a distance approximately equal to one-tenth the mean diameter of the coil, said eye encompassing the wire in its travel between the departure point and the driving means.

2. A welding apparatus comprising pedestal means, an open-mouthed cylindrical container with vertical axis having a rim with a peripheral face and an inward upwardly and downwardly directed shoulder on opposite sides of said face, said container enclosing a stationary coil of longitudinally seamed tubular welding electrode, said pedestal means having secured thereto an annular clamp channel-shaped in cross section engaging over the rim of the container, receiving the rim within its channel-shaped opening and fixing the relative position of the container and the pedestal means, said pedestal means supporting above and to one side of the top of said container electrode feed means, one end of said electrode leaving the coil at a departure point and snaking upward from said coil and being engaged thereabove by said feed means, the distance measured along said electrode from said departure point to said feed means being less than the mean circumference of the coil, said feed means feeding said electrode through a flexible tube to a welding nozzle, and means for supplying electric welding current to the electrode.

3. A welding apparatus as described in claim 2 wherein said pedestal means has a foot extending out from its lower end engaging the bottom of said container and comprising support means for said container.

4. A welding apparatus as described in claim 2 wherein guide means comprises a horizontally disposed eye rigidly secured between the departure point and the feed means, said eye receiving said electrode in its travel and being offset from the axis of the coil toward the said side of the container by a distance equal to approximately ⅒th of the diameter of the coil.

5. A welding apparatus as described in claim 2 wherein the upper end of said pedestal means has handle means secured thereto approximately over the center of gravity of the apparatus.

6. A welding apparatus as described in claim 2 wherein said annular clamp comprises a pair of relatively separable semi-circular elements.

7. A process for feeding longitudinally lap-seamed tubular welding electrode wire from a stationary coil having a vertical axis, the process comprising the steps of engaging a portion of the wire at a position above the coil with a driving means, the distance measured along said wire from its departure point from said coil to said driving means being less than the mean circumference of the coil, electrically charging said wire, and with said driving means urging said wire through a flexible delivery hose to a welding nozzle.

8. A process for feeding longitudinally lap-seamed tubular welding electrode wire without imparting a kink therein and opening up a lap-seam in the wire from a stationary coil positioned with its axis extending vertically, comprising the steps of grasping a portion of the wire at a position above the coil and driving the wire along at the grasped position, the distance measured along said wire from its departure point from said coil to said grasping position being less than the mean circumference of the coil, electrically charging said wire, and driving said wire through a flexible delivery hose to a welding nozzle.

9. Apparatus for feeding a fabricated welding wire defined by a longitudinally seamed tube compressed on a powdered core and formed in a coil with substantially no enlargement of the normal circumference of the wire in travelling from a continually changing point of departure of the wire from the coil to means for feeding the wire to a flexible hose, said apparatus comprising feed rollers, a portable unitary structure for supporting said feed rollers and a coil of the wire in a predetermined fixed relationship to one another, said unitary structure including a frame integrally attached to a pedestal, said frame adapted to support said coil with the axis of the coil extending vertically, said pedestal supporting said feed rollers to the side of said coil at an elevation higher than that of the top of said coil, means for driving said feed rollers, and means carried by said structure for locating said coil on said frame with the axis of said coil disposed substantially in the vertical plane passing through the bite of said feed rollers on the wire, said frame and said pedestal supporting said coil and said feed rollers in fixed positions, respectively, which are so located with respect to each other that the distance measured along the wire between said point of departure and said feed rollers is less than the mean circumference of said coil.

10. Apparatus for feeding a fabricated welding wire defined by a longitudinally seamed tube compressed on a powdered core and formed in a coil with substantially no enlargement of the normal circumference of the wire in travelling from a continually changing point of departure of the wire from the coil to means for feeding the wire to a flexible hose, said apparatus comprising feed rollers, a portable unitary structure for supporting said feed rollers and a coil of the wire in a predetermined fixed relationship to one another, said unitary structure including a frame integrally attached to a pedestal, said frame adapted to support said coil with the axis of the coil extending vertically, said pedestal supporting said feed rollers to the side of said coil at an elevation higher than that of the top of said coil, means for driving said feed rollers, means carried by said structure for locating said coil on said frame with the axis of said coil disposed substantially in the vertical plane passing through the bite of said feed rollers on the wire, a ring, means mounting said ring on said structure at an elevation lower than the elevation of said feed rollers, said ring disposed crosswise of said vertical plane with the center of said ring located substantially in said plane directly above said coil, said wire threaded through said ring and having its freedom of movement laterally to itself restricted by said ring in travelling between said coil and said feed rollers, said frame and said pedestal supporting said coil and said feed rollers, respectively, in fixed positions which are so located on said structure with respect to each other that the distance measured along the wire between said point of departure and said feed rollers is less than the mean circumference of said coil.

11. A process for feeding a fabricated wire defined by a longitudinally seamed tube compressed on a powdered core and formed in a coil from a continually changing point of departure of the wire from the coil to a flexible hose without rupturing the seam of the wire, characterized by engaging a portion of the wire at a position along the wire located above an end of the coil a distance measured along the wire from said point of departure of the wire from the coil which is less than the mean circumference of the coil, drawing the wire from said coil by applying force to said wire at said position of engagement to impart axial movement of the wire past said position of engagement, and feeding said wire from said position of engagement of the wire to a flexible hose without changing said defined distance between said departure point and said position of engagement of the wire and so limiting the axial twist of said wire between said departure point and said position of engagement of the wire to less than 360°.

References Cited in the file of this patent

UNITED STATES PATENTS 2,912,612     Brady et al. _____ Nov. 10, 1959